Figure 1:
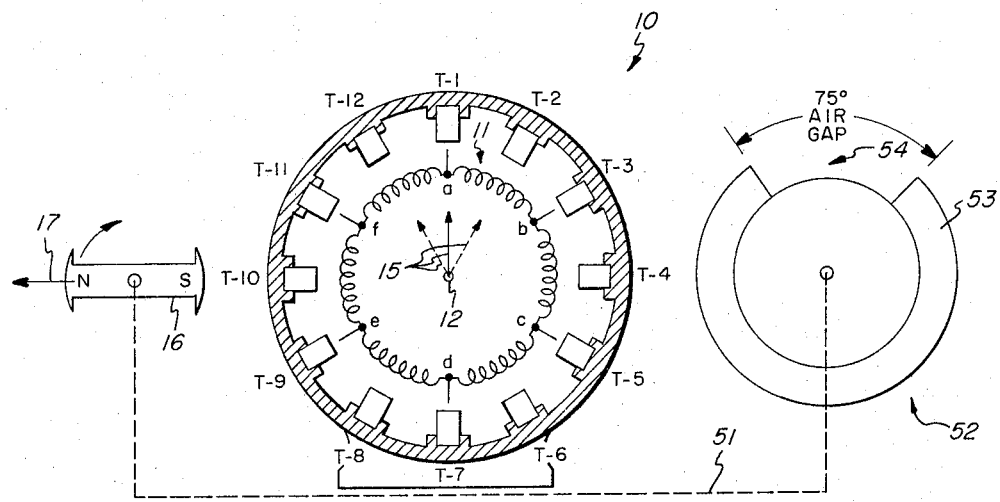

Nov. 15, 1966  C. D. PARKER ETAL  3,286,147
BRUSHLESS D.C. MOTOR

Filed June 19, 1963 3 Sheets-Sheet 1

INVENTORS
CARL D. PARKER
THOMAS G. WILSON
BY Arthur H. Serrell
ATTORNEY

| AXIS OF STATOR FIELD | TRANSFORMERS INITIALLY IN GAP AND SCR's CONTROLLED | | SCR's CONDUCTING TO STATOR WINDING POINTS |
|---|---|---|---|
| 0° | T-12 CONTROLS | SCR-17, SCR-20 | SCR-1, SCR-10 |
|  | T-1 CONTROLS | SCR-1, SCR-10 |  |
|  | T-2 CONTROLS | SCR-18, SCR-21 |  |
| 30° | T-1 CONTROLS | SCR-1, SCR-10 | SCR-1, SCR-10 and SCR-2, SCR-11 |
|  | T-2 CONTROLS | SCR-18, SCR-21 |  |
|  | T-3 CONTROLS | SCR-2, SCR-11 |  |
| 60° | T-2 CONTROLS | SCR-18, SCR-21 | SCR-2, SCR-11 |
|  | T-3 CONTROLS | SCR-2, SCR-11 |  |
|  | T-4 CONTROLS | SCR-13, SCR-22 |  |
| 90° | T-3 CONTROLS | SCR-2, SCR-11 | SCR-2, SCR-11 and SCR-3, SCR-12 |
|  | T-4 CONTROLS | SCR-13, SCR-22 |  |
|  | T-5 CONTROLS | SCR-3, SCR-12 |  |
| 120° | T-4 CONTROLS | SCR-13, SCR-22 | SCR-3, SCR-12 |
|  | T-5 CONTROLS | SCR-3, SCR-12 |  |
|  | T-6 CONTROLS | SCR-14, SCR-23 |  |
| 150° | T-5 CONTROLS | SCR-3, SCR-12 | SCR-3, SCR-12 and SCR-4, SCR-7 |
|  | T-6 CONTROLS | SCR-14, SCR-23 |  |
|  | T-7 CONTROLS | SCR-4, SCR-7 |  |
| 180° | T-6 CONTROLS | SCR-14, SCR-23 | SCR-4, SCR-7 |
|  | T-7 CONTROLS | SCR-4, SCR-7 |  |
|  | T-8 CONTROLS | SCR-15, SCR-24 |  |
| 210° | T-7 CONTROLS | SCR-4, SCR-7 | SCR-4, SCR-7 and SCR-5, SCR-8 |
|  | T-8 CONTROLS | SCR-15, SCR-24 |  |
|  | T-9 CONTROLS | SCR-5, SCR-8 |  |
| 240° | T-8 CONTROLS | SCR-15, SCR-24 | SCR-5, SCR-8 |
|  | T-9 CONTROLS | SCR-5, SCR-8 |  |
|  | T-10 CONTROLS | SCR-16, SCR-19 |  |
| 270° | T-9 CONTROLS | SCR-5, SCR-8 | SCR-5, SCR-8 and SCR-6, SCR-9 |
|  | T-10 CONTROLS | SCR-16, SCR-19 |  |
|  | T-11 CONTROLS | SCR-6, SCR-9 |  |
| 300° | T-10 CONTROLS | SCR-16, SCR-19 | SCR-6, SCR-9 |
|  | T-11 CONTROLS | SCR-6, SCR-9 |  |
|  | T-12 CONTROLS | SCR-17, SCR-20 |  |
| 330° | T-11 CONTROLS | SCR-6, SCR-9 | SCR-6, SCR-9 and SCR-1, SCR-10 |
|  | T-12 CONTROLS | SCR-17, SCR-20 |  |
|  | T-1 CONTROLS | SCR-1, SCR-10 |  |

FIG. 3.

INVENTORS
CARL D. PARKER
THOMAS G. WILSON
BY Arthur H. Serrell
ATTORNEY

Nov. 15, 1966     C. D. PARKER ETAL     3,286,147

BRUSHLESS D.C. MOTOR

Filed June 19, 1963     3 Sheets-Sheet 3

INVENTORS
CARL D. PARKER
THOMAS G. WILSON
BY
Arthur H. Serrell
ATTORNEY

United States Patent Office 3,286,147
Patented Nov. 15, 1966

3,286,147
BRUSHLESS D.C. MOTOR
Carl D. Parker and Thomas G. Wilson, Durham, N.C., assignors to Sperry Rand Corporation, Great Neck, N.Y., a corporation of Delaware
Filed June 19, 1963, Ser. No. 289,052
3 Claims. (Cl. 318—138)

This invention relates to an improvement in direct current motors. Known machines of this type include a wound rotor or armature that is energized through a mechanical commutator having fixed brushes and make-break commutating bars. The improved motor inverts the physical characteristics of the conventional D.C. machine to eliminate the need for mechanical commutation of the described brush type. In the improved brushless motor, the equivalent rotor or armature is provided by a wound stator that produces a rotating flux field through a plurality of circuits having solid state switching means therein that connect the stator in commutating relation to a D.C. source. No energy need be supplied through brushes or by transformer action to the rotor of the improved motor.

An object of the present invention is to eliminate the sliding make-break switch contacts between the brushes and commutator bars employed in conventional D.C. machines. This widens the field of usefulness of such machines where sparking problems have heretofore provided limitations. Avoidance of the use of mechanical commutators in D.C. machines also extends its operational life span materially while obviating the need of periodic maintenance and replacement of worn brushes.

In the improved motor, the included plurality of switching circuits connect a D.C. source to the wound stator at a number of commutating points. The motor includes a distributive coupling for operating the switching circuits in sequence having equiangularly spaced fixed members operatively connected to the switching means of the commutating circuits and a timing member driven by the rotor arranged in cyclically coupling and uncoupling relation to the individual fixed distributive members. The angular arrangement between the timing member, the rotor and the fixed members of the distributive coupling is such as to maintain a fixed angular spacing between the constant-magnitude field of the rotating rotor and the rotating field produced by the wound stator. Maximum torque while starting and while running is obtained when the noted components are arranged so that the angular spacing between the fields is approximately ninety electrical degrees.

In accordance with one of the features of the invention, each of the provided commutating circuits of the motor is connected to two tapped points of the wound stator that are one hundred and eighty electrical degrees apart.

Another feature of the invention resides in the provision of motor components of the type described in which the number of points at which the stator winding is tapped and the spacing between the points correspond respectively to one half the number of the fixed members of the distributive coupling and twice the angular spacing between the members.

A further feature of the invention resides in the inclusion in the motor structure of a distributive coupling with fixed angularly spaced members and a timing member connected to rotate with the rotor about an axis in coupling and uncoupling relation to the fixed members to close and open the solid state switching means of the respective commutating circuits in sequence.

Still a further feature of the invention resides in the provision of a motor structure in which the solid state switching means included in the commutating circuits are open condition or blocking rectifiers that are triggered cyclically by the coupling to a closed condition, and the circuits include means for restoring the rectifiers to an open condition.

Another feature of the invention resides in the distributive structure provided to control the operation of the switching means in the commutating circuit of the improved motor that includes a plurality of coupling members located in fixed equiangularly spaced relation about an axis and a timing member connected to the rotor to rotate about the axis having coupling and uncoupling parts where the angular dimension of one of the parts is greater than the angular spacing between three adjacent fixed members and less than the angular spacing between four successive fixed members.

Figure 2:
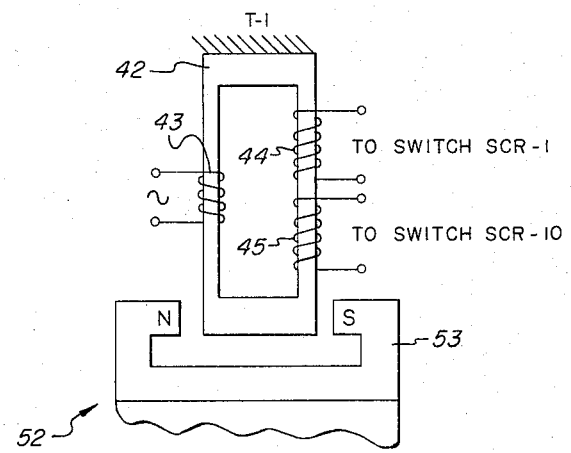
Figure 4:
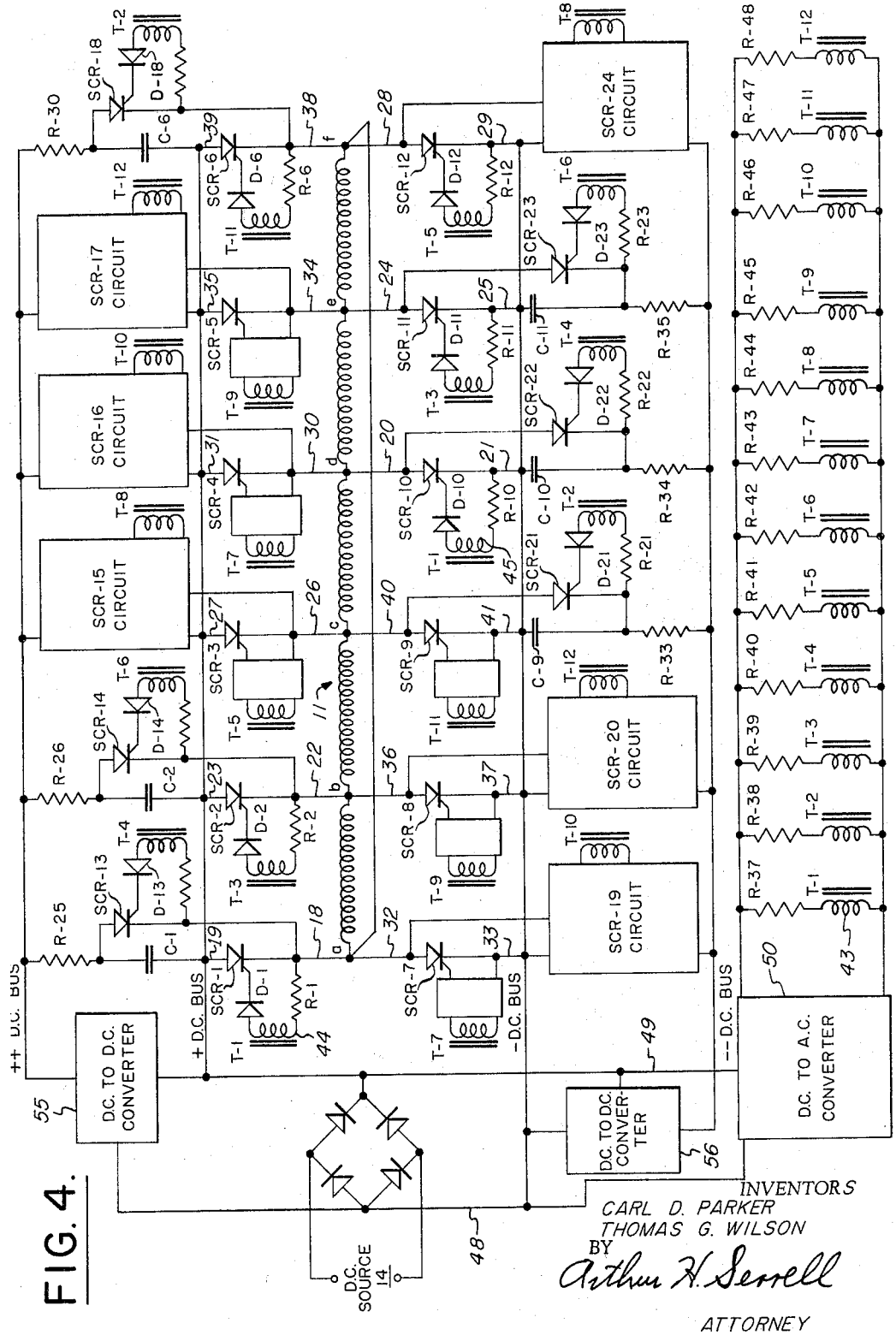

Other objects, features and structural details of the invention will be apparent from the following description when read in relation to the accompanying drawings in which:

FIG. 1 is a schematic view of an embodiment of the improved motor showing a shaft connection between the rotor and the timing member of the distributive structure and showing a representative angular relation between the commutating points of the wound stator and the equiangularly spaced fixed member of the distributive structure, FIG. 2 is a detail view of one of the fixed members of the distributive structure with a portion of the related timing member, FIG. 3 is a table showing the operation of the solid state switching means in relation to the distributive coupling throughout a complete cycle of operation of the motor and rotation of the rotor through three hundred and sixty degrees of travel, and FIG. 4 is a wiring diagram of the circuits to the wound stator that include the electrical components of the improved motor therein.

As represented in FIGS. 1 and 4, the stator of the improved motor as indicated at 10 includes a winding 11 that is tapped at equiangularly spaced commutating points $a$, $b$, $c$, $d$, $e$ and $f$ with relation to an axis 12. Each of the commutating circuits connect a D.C. source 14 to two of the tapped points of the wound stator 10 that are one hundred and eighty electrical degrees apart in sequence to produce a stator flux field that moves about axis 12 in a clockwise direction whose axial position at three hundred and thirty, zero, and thirty degrees is indicated by a vector 15 in FIG. 1 where the vertical position of vector 15 is taken as the zero degree reference location. The motor includes a rotor 16 that is magnetically polarized whose flux path is indicated by a vector 17. Rotor 16 rotates about axis 12 in the same direction as the stator field with vector 17 maintained in axially spaced relation to the moving stator field. At a ninety degree angular spacing between the fields the motor develops optimum torque at all speeds.

Each of the plurality of circuits connecting the stator 10 of the inverted brushless D.C. machine to source 14 includes solid state switching means therein indicated as rectifiers of the silicon controlled type. As shown in FIG. 4, commutating point $a$ is connected to the + D.C. bus from source 14 by way of lead 18, a silicon controlled rectifier SCR–1 when in triggered or closed switch condition, and lead 19. Related commutating point $d$ is connected to the − D.C. bus from source 14 by way of lead 20, a silicon controlled rectifier SCR–10 when in triggered or closed switch condition and lead 21. The closed circuit between the source 14 and winding 11 at points $a$ and $d$ produces the solid line vector 15 of the stator field represented in the zero degree angular relation to axis 12 in FIG. 1. The silicon controlled rectifier switches which are triggered when the vector 15 is in its solid line position are shown in FIG. 3 corresponding to the condition indicated as axis of stator field at zero degrees. The field of the stator moves thirty degrees with relation to axis 12 when the additional commutating point b in FIG. 4 is connected to the + D.C. bus by way of lead 22, SCR–2 when in triggered or closed switch condition and lead 23 and its related commutating point e is connected to the — D.C. bus by way of lead 24, SCR–11 when in triggered or closed switch condition and lead 25. The closed circuit connecting points a and b of winding 11 to the + D.C. bus and points d and e of winding 11 to the — D.C. bus produces the broken line vector 15 in the thirty degree angular relation to axis 12 in FIG. 1. The conditions corresponding to this location of the stator field are indicated in FIG. 3 as axis of stator field at thirty degrees. The field of the stator moves another thirty degrees with relation to axis 12 when switches SCR–1 and SCR–10 are restored to an open switch condition leaving only commutating point b connected to the + D.C. bus and commutating point e connected to the — D.C. bus. The corresponding conditions for this position of the stator field are shown in FIG. 3 as axis of stator field at sixty degrees.

To obtain the rotating field of the stator, similar circuitry is provided to sequentially connect the related commutating points b–c, e–f; c, f; c–d, f–a; d, a; d–e, a–b; e, b; e–f, b–c; f, c; and f–a, c–d across the + and — D.C. busses. The point c is connected to the + D.C. bus by way of lead 26, the SCR–3 and lead 27. Related point f is connected to the — D.C. bus by way of lead 28, the SCR–12 and lead 29. In the reverse polarizing circuits, point d is connected to the + D.C. bus through lead 30, the SCR–4 and lead 31. Related point a is connected to the — D.C. bus through lead 32, the SCR–7 and lead 33. Point e is connected by lead 34, the SCR–5 and lead 35 to the + D.C. bus. Related point b is connected by lead 36, the SCR–8 and lead 37 to the — D.C. bus. Also, point f is connected to the + D.C. bus by lead 38, the SCR–6 and the lead 39. Also, related point c is connected to the — D.C. bus by lead 40, the SCR–9 and lead 41. The enumerated switching rectifiers operate in paired relation in the sequence shown in FIG. 3 to close the respective commutating circuits so that the wound stator 10 produces a rotating flux field. The table relates the numbered rectifiers that are conducting to the corresponding axis of the stator field with regard to axis 12 through an operating range of one revolution.

To maintain the position of the axis of the moving stator field in spaced relation to the field of the rotor 16, the described rectifiers SCR–1 through SCR–12 are triggered in pairs to a closed switch condition cyclically. To obtain this result, the improved motor includes a distributor having fixed members operatively connected to the switching means and a moving member mechanically connected to the rotor 16. As shown in FIG. 1, the coupling is magnetic in character and the fixed members are provided by a plurality of transformers T–1, T–2, T–3, T–4, T–5, T–6, T–7, T–8, T–9, T–10, T–11, and T–12 whose cores are fixed in equiangular spaced relation about an axis such as the axis 12. In the illustrated embodiment of the invention, the twelve transformers are suitably fixed to the housing of the stator 10 with thirty degree angular spacing about the axis 12. The spacing and number of transformers accordingly corresponds to half the spacing and twice the number of the six commutating points a, b, c, d, e and f of the improved motor. As the structures of the respective transformers are identical and the circuit tie in with the related rectifiers is indicated in FIG. 3, the present detail description of this relation is limited to the transformers T–1 and T–2 and the gates or switching rectifiers SCR–1, SCR–10, SCR–18 and SCR–21 to avoid unnecessary repetition. The transformer T–1 shown in FIG. 2 includes a saturable core 42 having a primary winding 43, a secondary winding 44 whose output is used to trigger the rectifier SCR–1, and a secondary winding 45 whose output is used to trigger the rectifier SCR–10. Transformer T–2 is an identical transformer having a saturable core, one primary winding and two secondary windings. The output of one of its secondary windings is used for switching on a blocking rectifier SCR–18 opening the circuit to the point f controlled by the rectifier SCR–6 and the output of the other secondary winding is used for switching on a blocking rectifier SCR–21 opening the circuit to the related point c controlled by the rectifier SCR–9. The circuits provided to restore the commutating rectifiers SCR–1, SCR–2, SCR–3, SCR–4, SCR–5, SCR–7, SCR–8, SCR–10, SCR–11 and SCR–12 to an open switch condition include related rectifiers indicated at SCR–13, SCR–14, SCR–15, SCR–16, SCR–17, SCR–19, SCR–20, SCR–22, SCR–23 and SCR–24. As the stator field moves through three hundred and sixty degrees with relation to axis 12, the rectifiers SCR–6 and SCR–9 to the points f and c are cut off by the rectifiers SCR–18 and SCR–21. The rectifiers SCR–13 and SCR–22 perform a similar function for the considered range of operation of the motor under control of the transformer T–4 and will accordingly be hereinafter described in detail.

As shown in FIG. 4, A.C. power is supplied to the primary winding 43 of transformer T–1 from source 14 by way of leads 48 and 49, a D.C. to A.C. converter 50 and resistor R–37. Converter 50 also energizes the primary windings of the other transformers T–2, T–3, T–4, T–5, T–6, T–7, T–8, T–9, T–11 and T–12. The timing member of the coupling shown in FIG. 1 is driven by shaft 51 from the rotor 16 to rotate about the axis of the transformers which may correspond to the field axis 12 of the machine. As shown in FIG. 1, the driven timing member indicated at 52 includes a magnet 53 of two hundred and eighty-five degree angular dimension and an air gap 54 of seventy-five degree angular dimension. In the structure provided, the angular arrangement of the timing member 52, the rotor 16 and the fixed transformers of the coupling with relation to axis 12 is such that the angular spacing between the flux fields of the rotor and stator is approximately ninety degrees. Member 52 moves with relation to the transformers T–1 through T–12 in cyclic coupling and uncoupling relation to each of the individual cores of the equiangularly spaced fixed members of the coupling. In the provided coupling, one of the legs of the cores of the transformers is saturated by the adjacent magnet 53 so that there is a null secondary transformer output when the cores are under the influence of the field of the magnet.

To trigger the rectifiers SCR–1 and SCR–10, the magnetic part 53 of the timing member 52 moves away from the core 42 of transformer T–1 and is replaced by the gap 54 with the axis of the stator field at the three hundred and thirty degree angular position indicated in FIG. 3. In the sixty degree operational range considered, the transformer T–1 is not returned to a saturated condition before the gap 54 has moved first to the core of the adjacent transformer T–2 and then to the core of the following transformer T–3. The output of T–2 is effective to trigger rectifiers SCR–18 and SCR–21 and the output of T–3 is effective to trigger the rectifier SCR–2 to the winding point b and the rectifier SCR–11 to the winding point e. The field of the stator thus is caused to rotate in steps through the considered sixty degree angular range and continues to move in a like manner as the member 52 and rotor 16 rotate through three hundred and sixty degrees.

The triggering and restoring circuits shown in FIG. 4 particularly for SCR–1, SCR–2. SCR–10, SCR–11, SCR–13 and SCR–22 include a ++ D.C. bus connected to source 14 by way of converter 55 and a — — D.C. bus connected to source 14 by way of converter 56. The respective D.C. busses provide a potential that is greater than that of the respective + and — D.C. busses. At the three hundred and thirty degree angular position of the stator field, the rectifier SCR–1 is triggered by the output of secondary winding 44 of T–1 through diode D-1 and rectifier SCR-10 is triggered by the output of the secondary winding 45 of T-1 through diode D-10. This establishes the connection between the source 14 and the points *a* and *d* of the wound stator 10.

The means provided for restoring the rectifiers SCR-1 and SCR-10 to open switch or blocking condition includes the blocking rectifiers SCR-13 and SCR-22, a condenser C-1 between the ++ D.C. bus and rectifier SCR-1, and a condenser C-10 between the -- D.C. bus and rectifier SCR-10. The noted condensers charged at a greater voltage than the related D.C. busses discharge backwardly through the rectifier SCR-1 and rectifier SCR-10 when the blocking rectifiers SCR-13 and SCR-22 are turned on as indicated in FIG. 3 by the continuous rotation of timing element 52 to energize the output winding of transformer T-4 connected to the rectifier SCR-13 by way of diode D-13 as well as the output winding of the transformer T-4 connected to rectifier SCR-22 by way of diode D-22. In the complete rotative cycle, the rectifiers SCR-14, SCR-23; the rectifiers SCR-15, SCR-24; the rectifiers SCR-16, SCR-19; the rectifiers SCR-17, SCR-20 and the rectifiers SCR-18, SCR-21 operate in sequence to restore the triggered solid state rectifiers to an open switch condition as indicated in FIG. 3.

The angular dimension of the gap 54 of the timing member 52 is greater than the angular spacing between three adjacent transformer cores and less than the angular spacing between four successive transformer cores in order to insure that the motor will develop starting torque. The represented gap dimension of seventy-five degrees is illustrative as where six fixed transformer cores are used in the distributive coupling this dimension may vary between sixty and ninety degrees with a developed starting torque or be forty-five degrees where a starting torque is not required.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A D.C. motor of the brushless type including a stator having a winding, a magnetically polarized rotor; a commutating circuit having a first SCR with an anode connected to a first D.C. bus, a cathode connected to the stator winding and a gate, a second SCR with an anode connected to the stator winding one hundred and eighty degrees apart from the connection of the first SCR; a cathode connected to the D.C. bus, and a gate; a restoring circuit including a third SCR having a cathode connected to the cathode of the first SCR, an anode connected to a second D.C. bus of higher voltage than the first bus, a capacitor between the anodes of the first and third SCR's, and a gate, a fourth SCR having an anode connected to the anode of the second SCR, a cathode connected to the second D.C. bus, a capacitor between the cathodes of the second and fourth SCR's and a gate, and a distributor operatively connected to the gates of the first and second SCR's and the gates of the third and fourth SCR's having a part movable with the rotor for sequentially triggering the SCR's in pairs.

2. In a D.C. motor of the brushless type, the combination of a stator having a winding, a magnetically polarized rotor; a commutating circuit having a first SCR with an anode connected to a first D.C. bus, a cathode connected to the stator winding and a gate; a restoring circuit having a second SCR with a cathode connected to the cathode of the first SCR, an anode connected to a second D.C. bus of higher voltage than the first bus, a capacitor between the anodes of the first and second SCR's, and a gate; and a distributor operatively connected to the gates having a part movable with the rotor for sequentially triggering the SCR's.

3. In a D.C. motor of the brushless type, the combination of a stator having a winding, a magnetically polarized rotor; a commutating circuit having a first SCR with an anode connected to the stator winding, a cathode connected to a first D.C. bus and a gate; a restoring circuit having a second SCR with an anode connected to the anode of the first SCR, a cathode connected to a second D.C. bus, a capacitor between the cathodes of the first and second SCR's and a gate; and a distributor operatively connected to the gates having a part movable with the rotor for sequentially triggering the SCR's.

References Cited by the Examiner

UNITED STATES PATENTS

| 2,980,839 | 4/1961 | Haeussermann | 318—138 |
| 3,025,443 | 3/1952 | Wilkinson et al. | 318—138 |
| 3,091,728 | 5/1963 | Hogan et al. | 318—138 |
| 3,159,777 | 12/1964 | Manteuffel | 318—138 |

ORIS L. RADER, *Primary Examiner.*

S. GORDON, G. SIMMONS, *Assistant Examiners.*